United States Patent
Liu (10) Patent No.: US 6,554,302 B1
(45) Date of Patent: Apr. 29, 2003

(54) TRICYCLE OPERATED BY TORSION THEREOF

(76) Inventor: Yueh-Fen Liu, P. O. Box 453, Taichung (TW)

( * ) Notice: Subject to any disclaimer, the term of this patent is extended or adjusted under 35 U.S.C. 154(b) by 0 days.

(21) Appl. No.: 09/988,098

(22) Filed: Nov. 19, 2001

(51) Int. Cl.[7] .................................................. B62M 1/00
(52) U.S. Cl. .................................. 280/87.041; 280/220
(58) Field of Search ........................ 280/87.041, 87.021, 280/87.042, 87.05, 62, 655, 639, 11.204, 11.212, 11.211, 11.223, 220, 279, 288, 204, 495; 301/111.01, 111.06

(56) References Cited

U.S. PATENT DOCUMENTS

| 3,287,023 | A | * | 11/1966 | Ware ...................... 280/11.209 |
|---|---|---|---|---|
| 3,567,249 | A | * | 3/1971 | Robinson ................... 280/204 |
| 3,993,320 | A | * | 11/1976 | Robinson ................... 280/204 |
| 4,071,261 | A | * | 1/1978 | Winchell ................... 280/220 |
| 4,123,079 | A | * | 10/1978 | Biskup ................. 280/87.042 |
| 4,133,551 | A | * | 1/1979 | Biskup ....................... 280/221 |
| 4,300,781 | A | * | 11/1981 | Riggs .................... 280/11.212 |
| 4,307,893 | A | * | 12/1981 | Ragland .................... 280/204 |
| 4,540,192 | A | * | 9/1985 | Shelton ...................... 280/282 |
| 5,388,846 | A | * | 2/1995 | Gierveld ................ 280/11.223 |
| RE35,493 | E | * | 4/1997 | Horton .................. 280/11.206 |
| 5,785,331 | A | * | 7/1998 | Rappaport ............. 280/87.041 |
| 5,941,539 | A | * | 8/1999 | Pratt ....................... 280/11.27 |
| 6,059,304 | A | * | 5/2000 | Kakimi .................. 280/124.11 |
| 6,220,612 | B1 | * | 4/2001 | Beleski, Jr. ............ 280/87.041 |
| 6,276,696 | B1 | * | 8/2001 | Wong .................... 280/11.222 |
| 6,318,741 | B1 | * | 11/2001 | Chen .................... 280/87.041 |
| 6,467,781 | B1 | * | 10/2002 | Feng ....................... 280/87.01 |

* cited by examiner

*Primary Examiner*—Brian L. Johnson
*Assistant Examiner*—Kelly E Campbell
(74) *Attorney, Agent, or Firm*—Harrison & Egbert (57) ABSTRACT

A tricycle comprises an upright handlebar, a front wheel frame, two expandable footboard support rods, and two braking devices. The front wheel frame is fastened with the bottom end of the upright handlebar and is provided with an elongated hole for locating a front wheel axle. The two expandable footboard support rods are jointly fastened with the upright handlebar by a lashing member. The braking devices comprise a rotary support rod, and a braking rod which is fastened at one end with a brake cable and is provided at other end with a braking portion capable of being forced against a rear wheel at the time when the braking rod is activated by the brake cable.

1 Claim, 11 Drawing Sheets

TRICYCLE OPERATED BY TORSION THEREOF

BACKGROUND OF THE INVENTION

1. Field of the Invention

The present invention relates generally to an amusement light vehicle, and more particularly to a light three-wheeled amusement vehicle which is provided with means to operate by torsional force of the vehicle.

2. Description of Related Art

Figure 1:
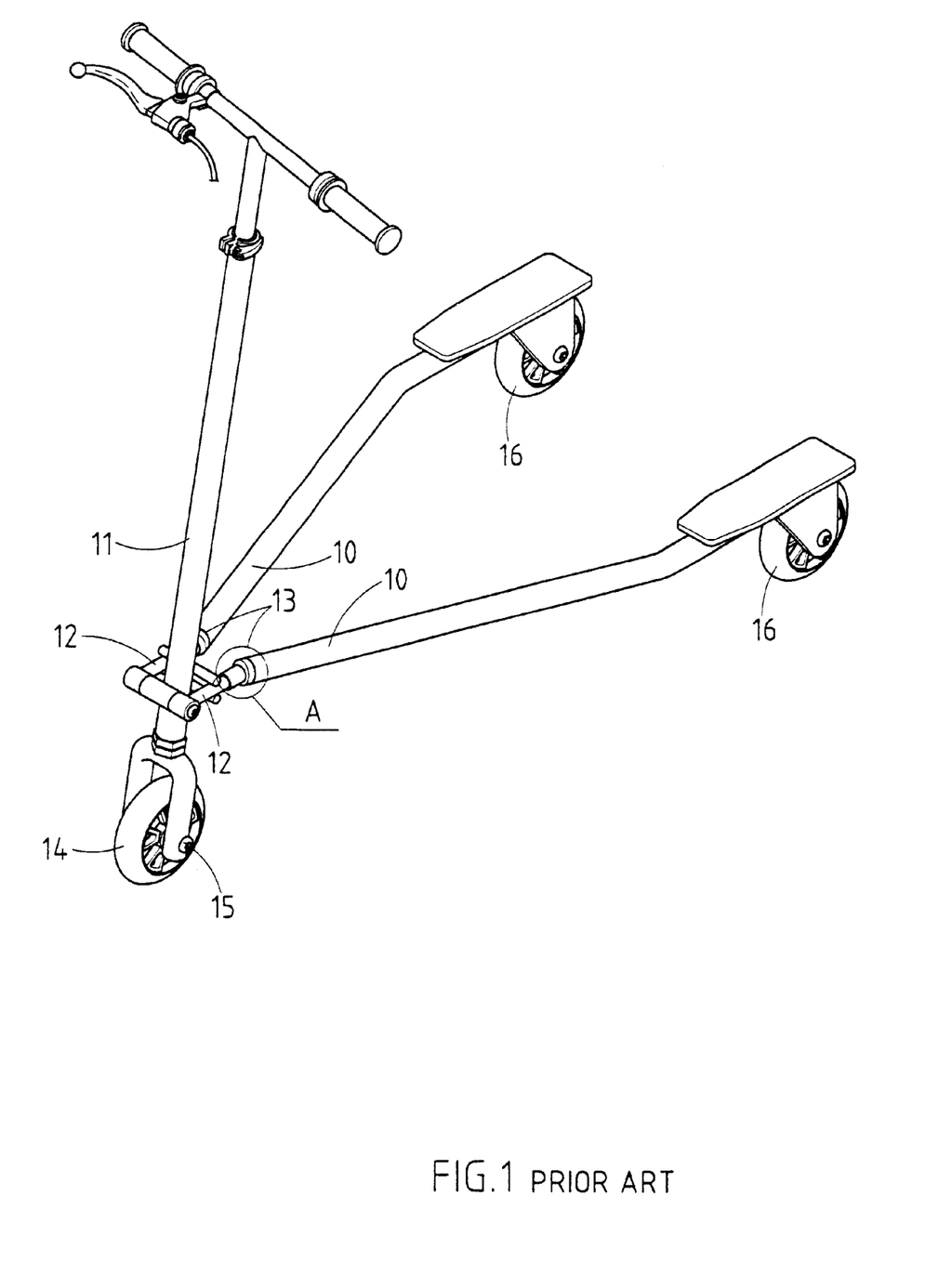
FIG. 1 shows a perspective view of a tricycle of the prior art.
Figure 2:
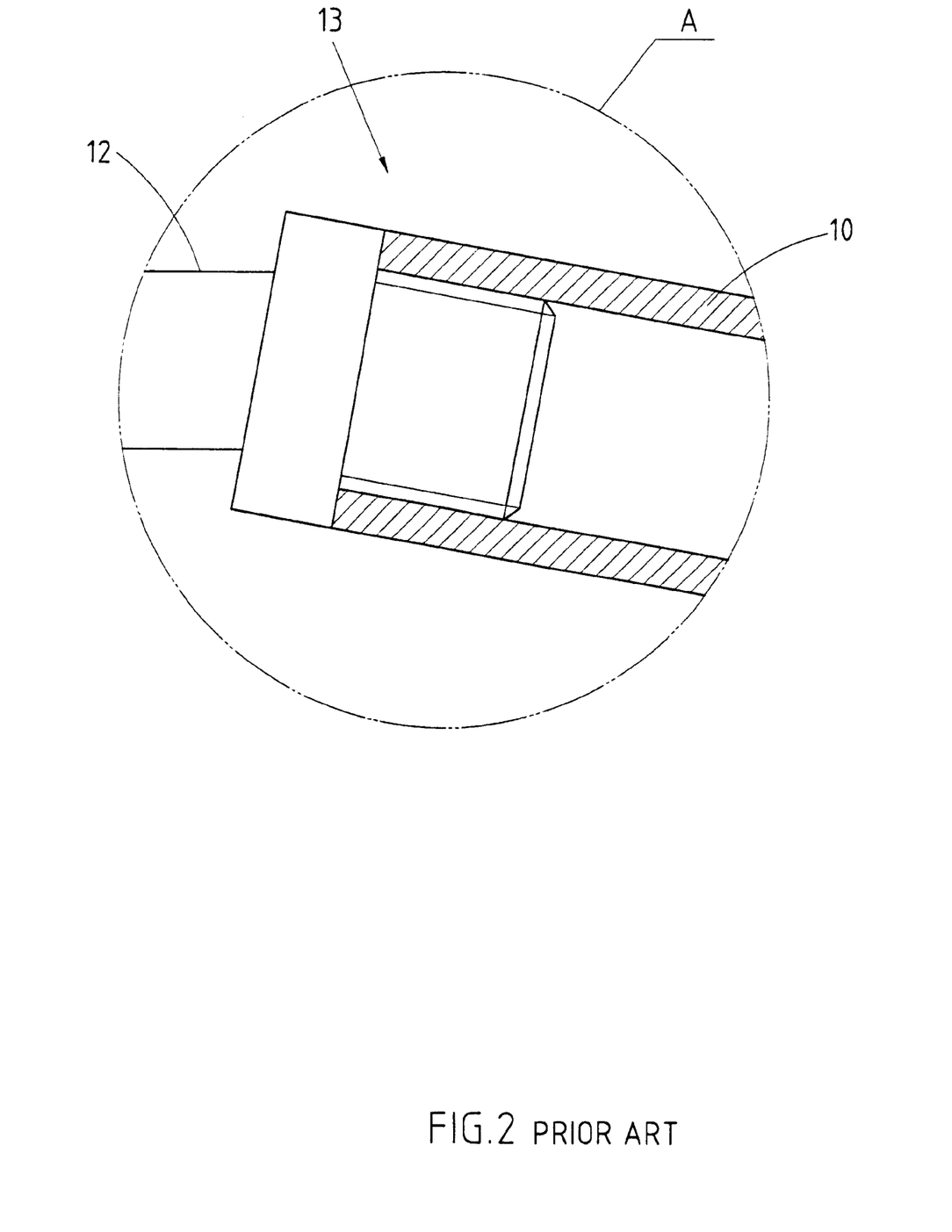
FIG. 2 shows an enlarged sectional view of a portion indicated by a circle "A" as shown in FIG. 1.
Figure 3:
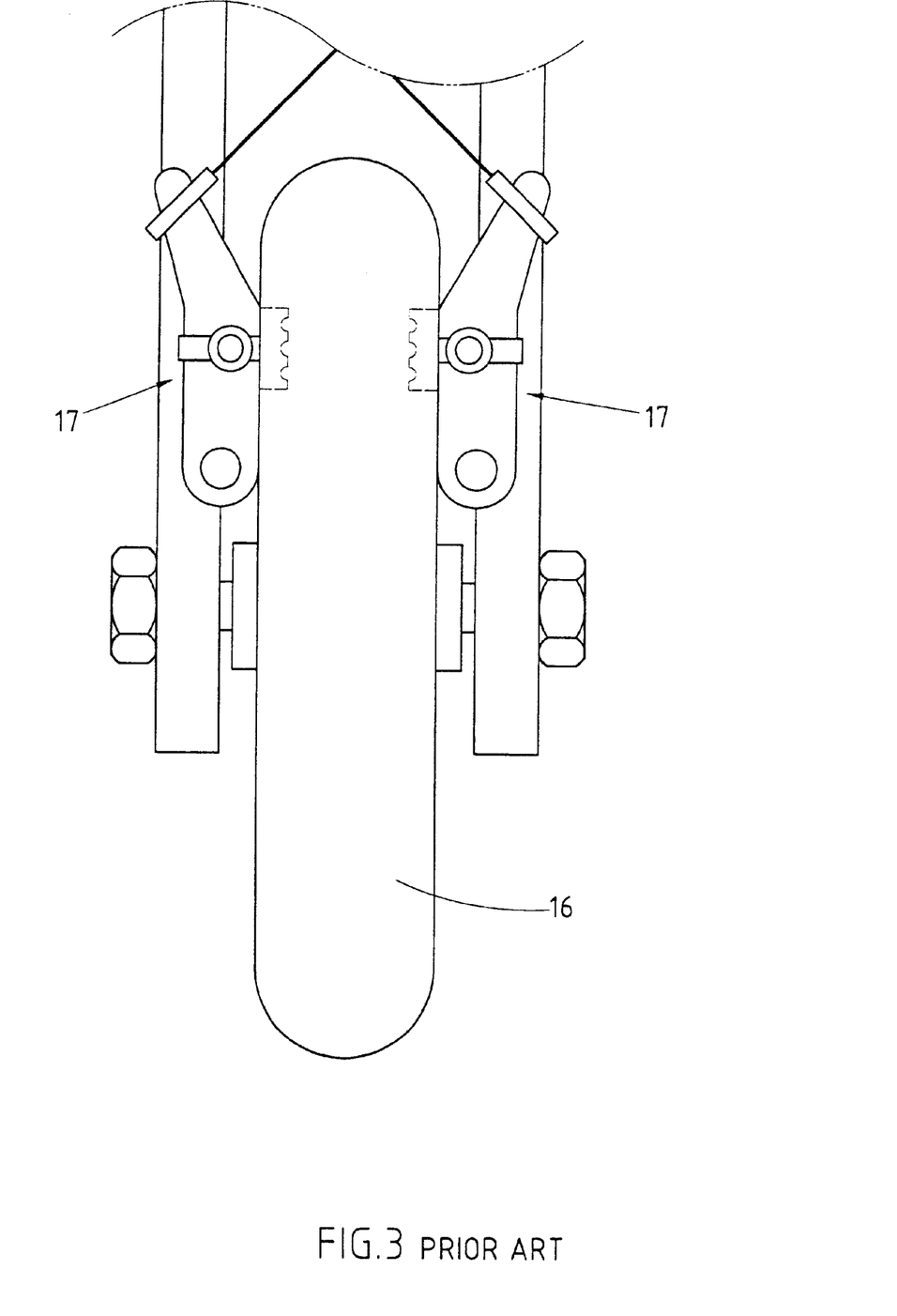
FIG. 3 shows a top schematic view of the braking device of the prior art tricycle as shown in FIG. 1.

As shown in FIGS. 1–3, a prior art tricycle is operated by torsion thereof such that the prior art tricycle is capable of moving in a zigzag manner. The prior art tricycle is used for amusement and exercise.

An shown in FIG. 1, the prior art tricycle comprises two footboard support rods 10, which are joined with an upright handlebar 11 by a plurality of fastening rods 12. Located between the front end of the footboard support rod 10 and the fastening rod 12 is a curved assembly portion 13 having threads. In order words, the footboard support rod 10 and the fastening rod 12 are fastened together by means of threads and grooves. Such a fastening method can not hold the tricycle frame together securely in light of the tricycle being subjected to torsion. In addition, a front wheel 14 is mounted on an axle 15 which is fixedly fastened with the tricycle frame such that the axial distance between the front wheel 14 and the rear wheels 16 can not be adjusted to allow variation in the twisting effect.

The prior art tricycle is provided with two braking devices 17, as shown in FIG. 3. The braking devices 17 are used to press against the rear wheel 16 in motion, so as to slow down or stop the tricycle. The braking devices 17 are defective in design in that they are apt to jam the rear wheel 16, thereby resulting in the safety hazard.

BRIEF SUMMARY OF THE INVENTION

The primary objective of the present invention is to provide a tricycle which is free of the shortcomings of the prior art tricycle described above.

In keeping with the principle of the present invention, the foregoing objective of the present invention is attained by a tricycle comprising an upright handlebar, a front wheel frame, two footboard support rods, and two braking devices. The front wheel frame is fastened with the bottom end of the handlebar and is provided with an elongated hole for fastening a front wheel axle. The two footboard support rods are jointly fastened with the handlebar by a lashing member in conjunction with a plurality of fastening bolts. The braking devices comprise a rotary support rod and a braking rod which is provided at one end with a braking portion capable of being forced against the rear wheel in motion at the time when the braking rod is turned, thereby preventing the rear wheel from being jammed.

DETAILED DESCRIPTION OF THE INVENTION

As shown in FIGS. 4–11, a tricycle embodied in the present invention comprises a steering rod 20, a front wheel frame 30, two footboard support rods 40, and two braking devices 70.

Figure 4:
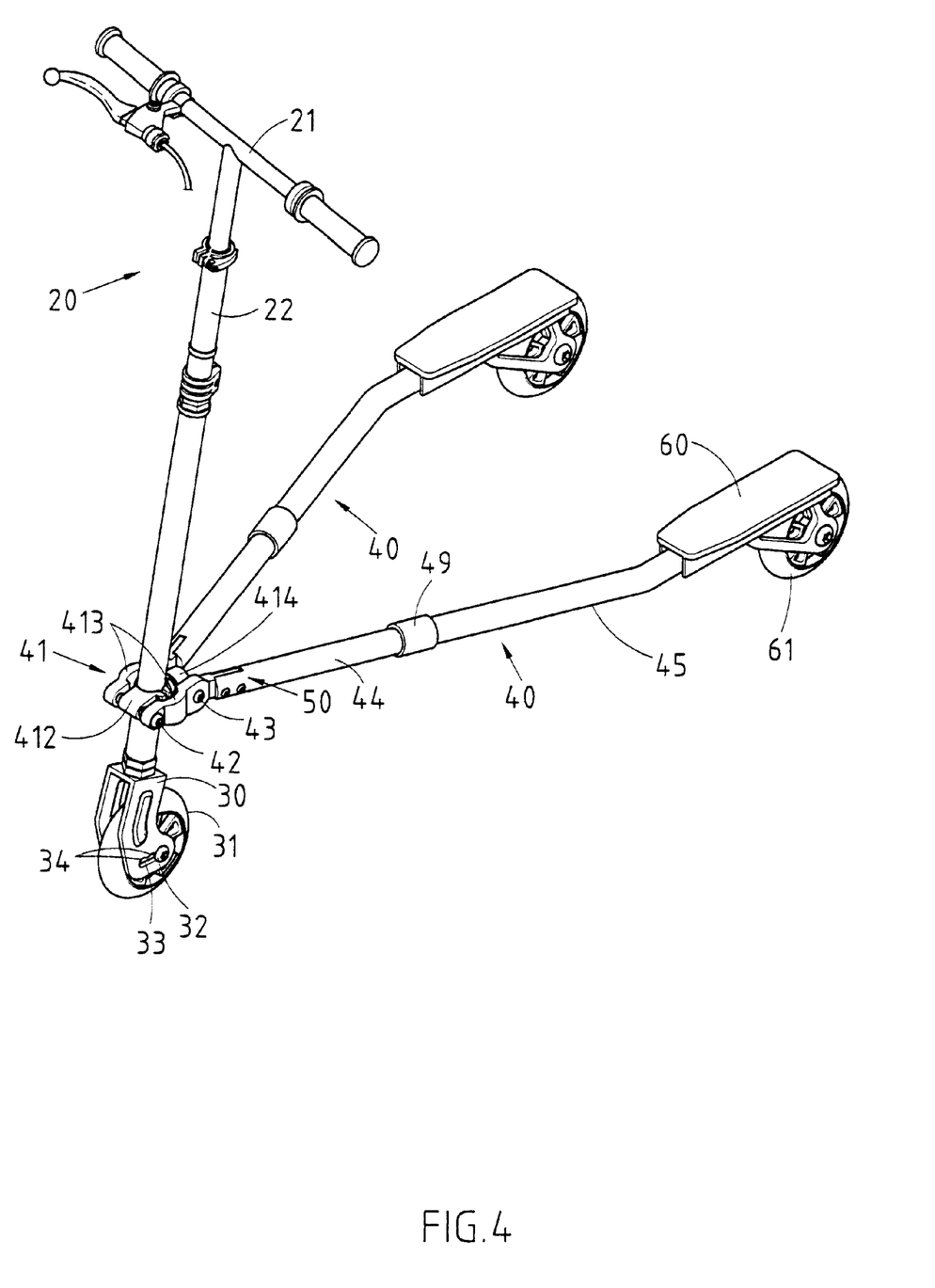
FIG. 4 shows a perspective view of a tricycle of the present invention.

The steering rod 20 is formed of a horizontal handlebar 21 and an upright handlebar 22.

Figure 6:
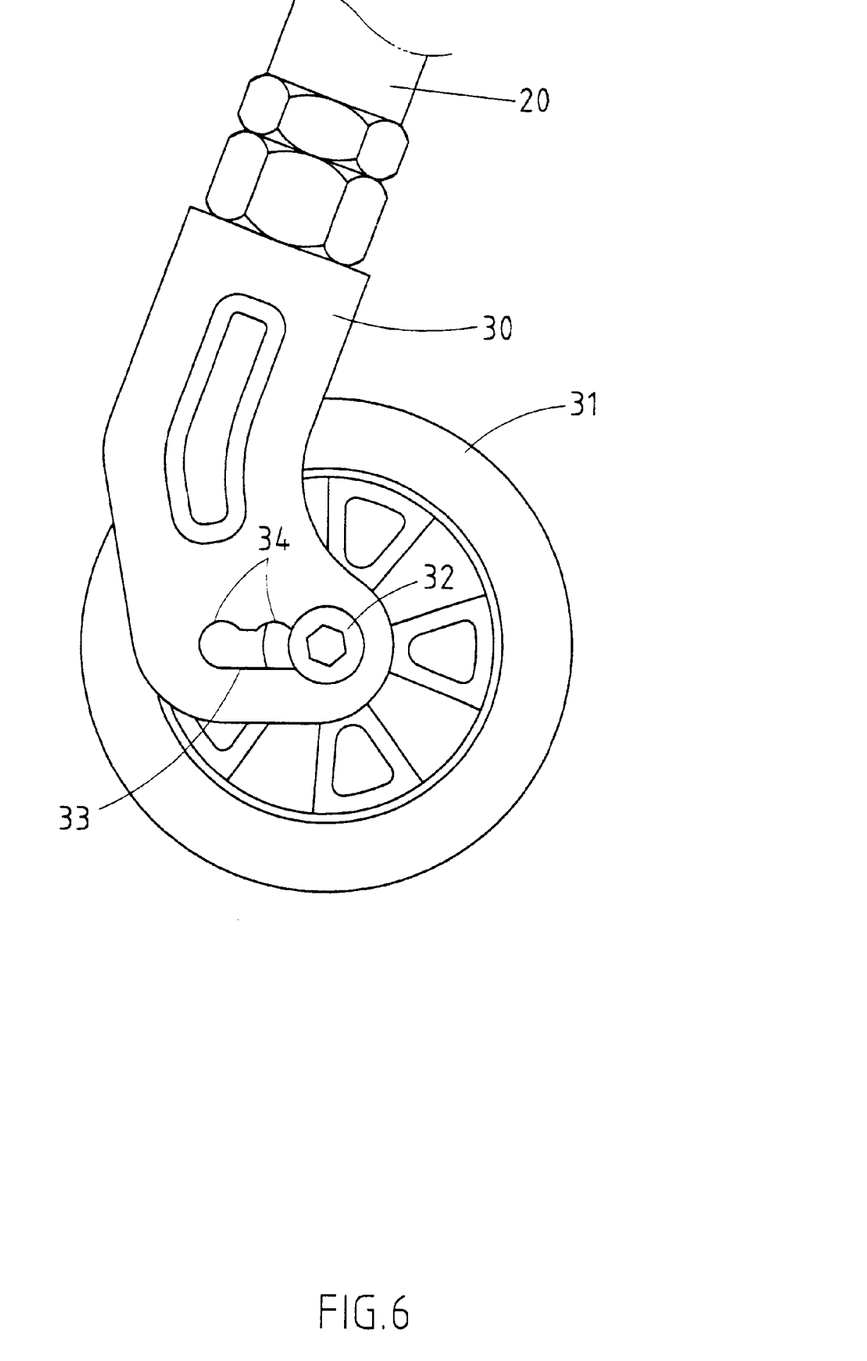
FIG. 6 shows a side schematic view of the front wheel of the tricycle of the present invention.
Figure 7:
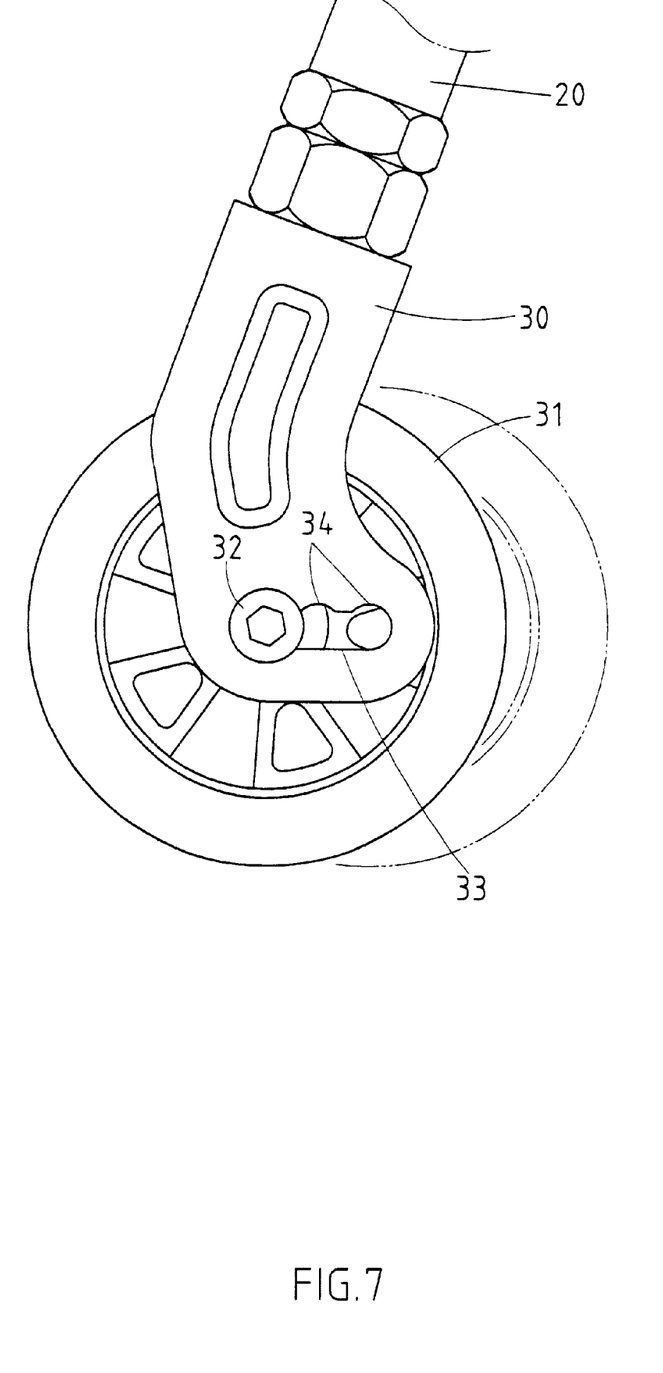
FIG. 7 shows a side schematic view of illustrate the adjusting of the front wheel of the tricycle of the present invention.

The front wheel frame 30 is pivotally fastened with the bottom end of the upright handlebar 22 for mounting a front wheel 31 by an axle 32. The front wheel frame is provided with two elongated holes 33 which are opposite in location to each other and are provided with a plurality of locating portions 34 for locating the axle 32. The axle 32 can be thus adjusted in location in the elongated holes 33, thereby resulting in a change in the axial distance between the front wheel 31 and the rear wheels 61.

Figure 5:
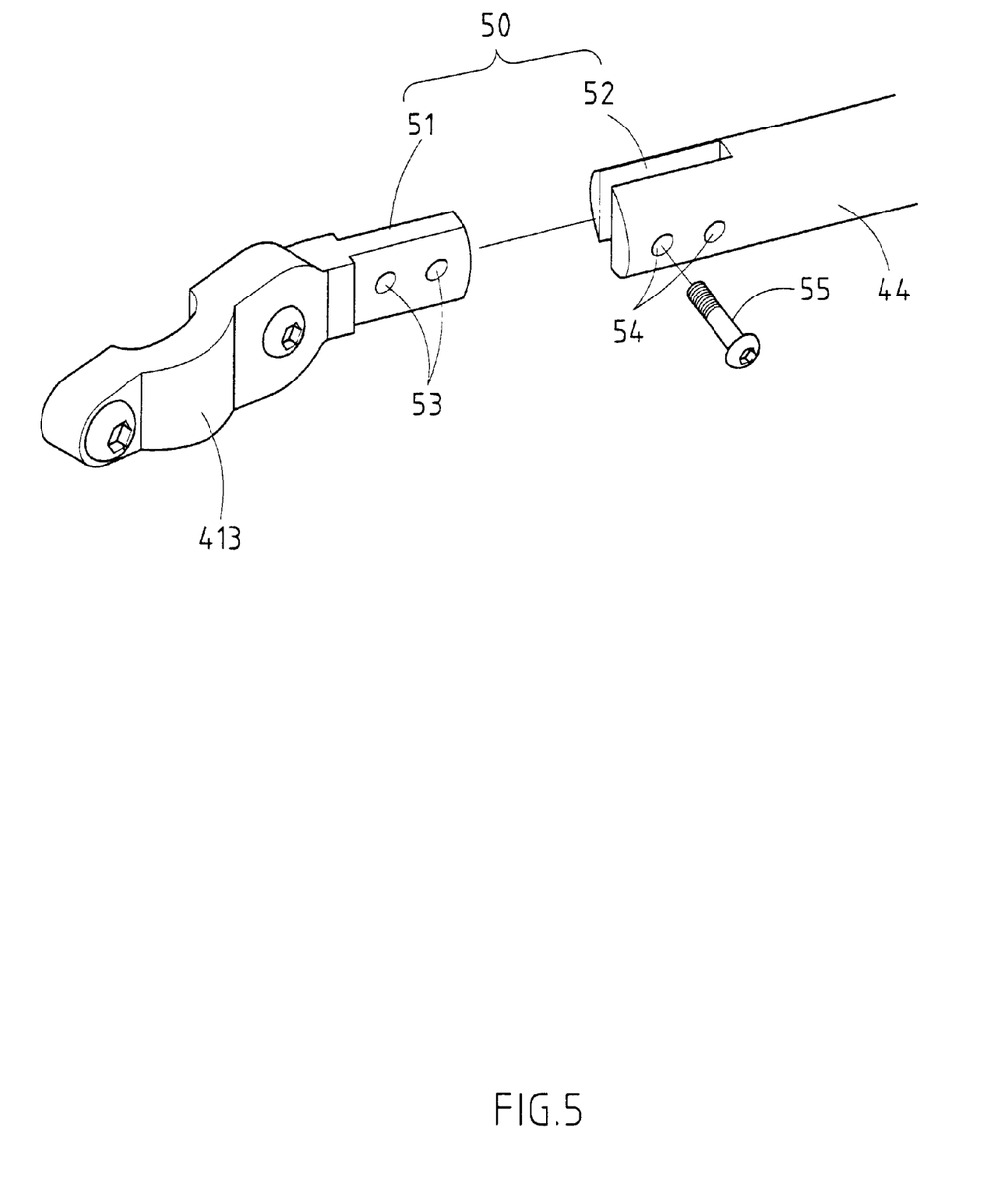
FIG. 5 shows an exploded view of an assembly portion of the tricycle of the present invention.
Figure 8:
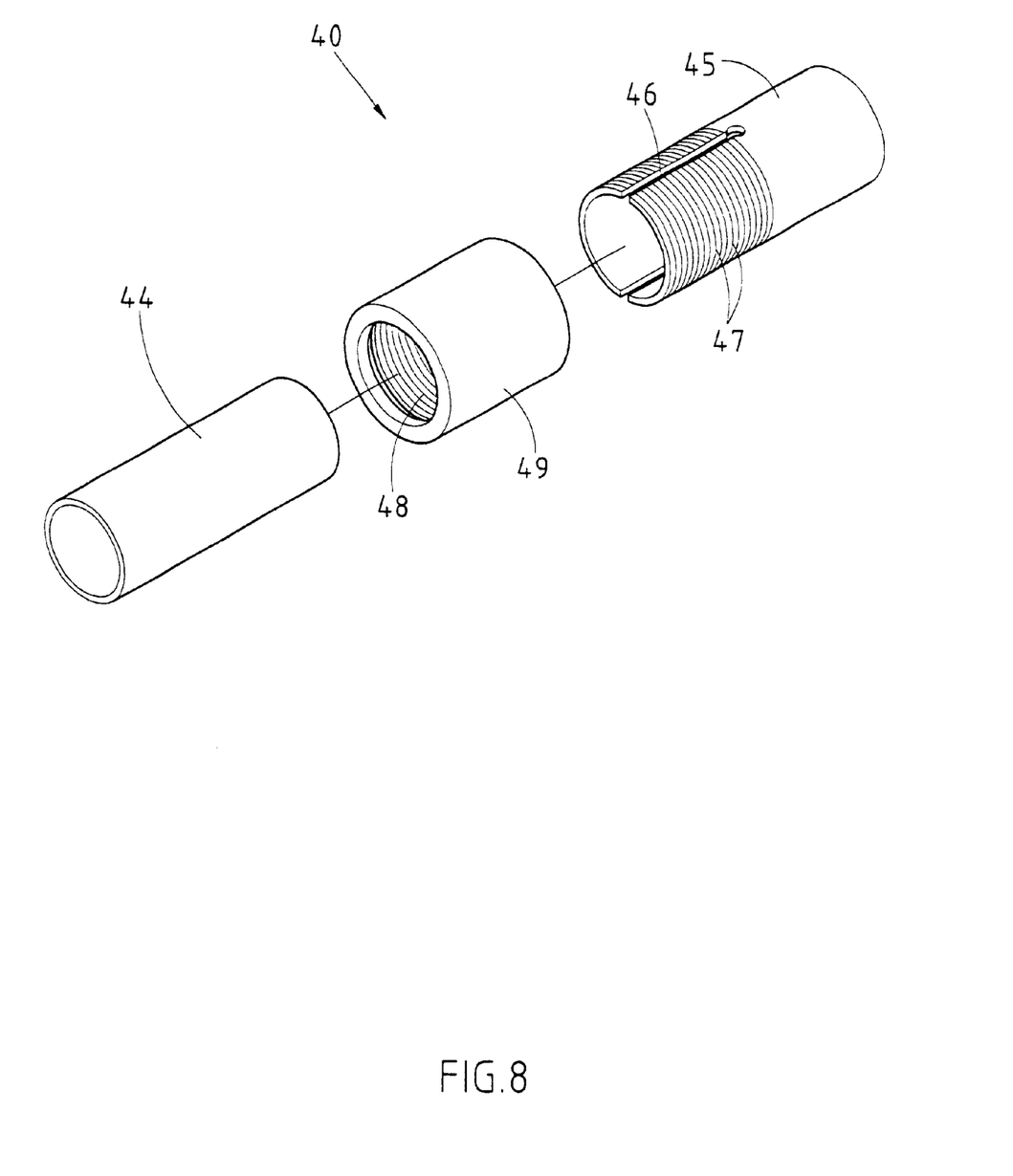
FIG. 8 shows an exploded view of the footboard support rod of the tricycle of the present invention.
Figure 9:
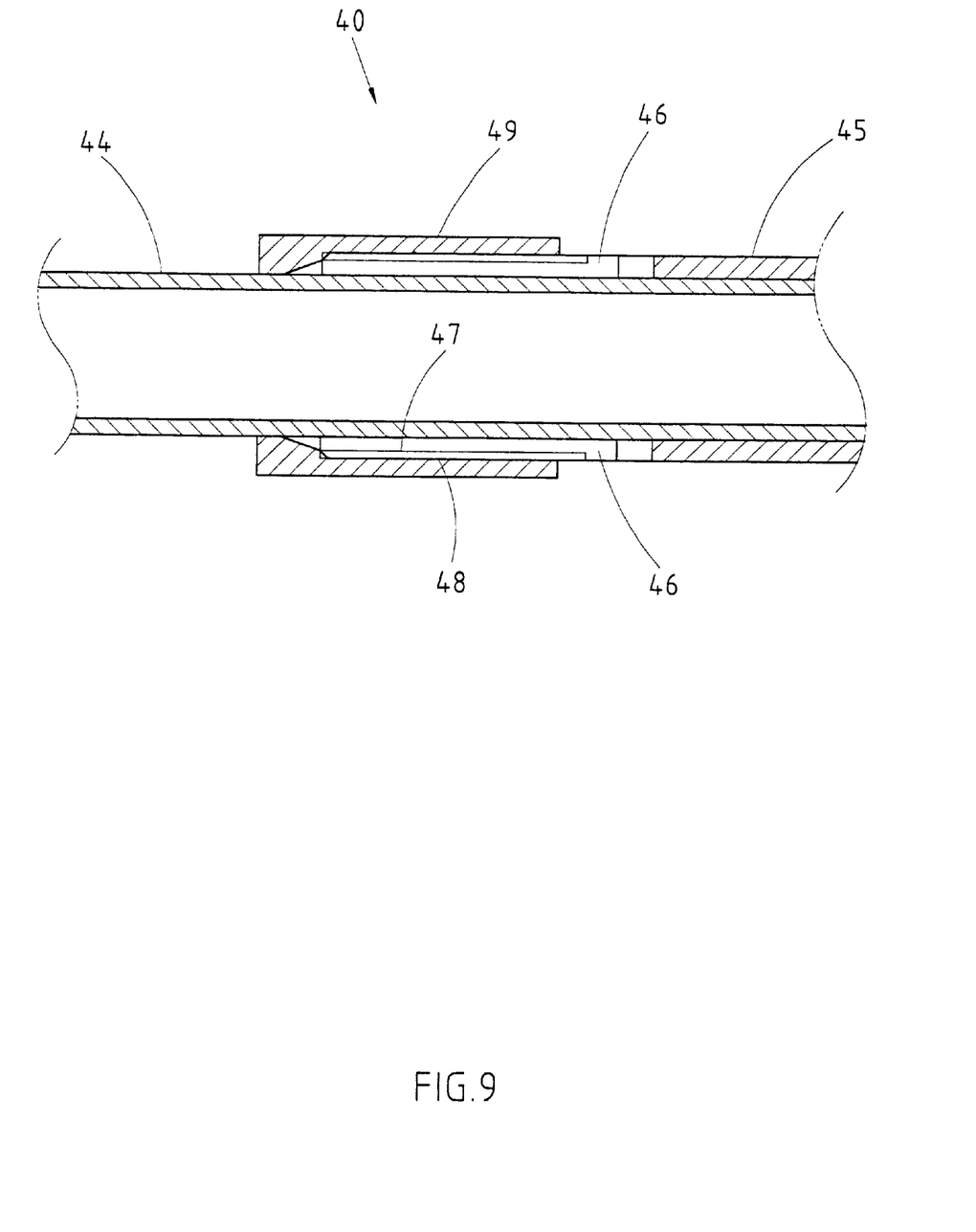
FIG. 9 shows a longitudinal sectional view of an expandable portion of the footboard support rod of the tricycle of the present invention.

The two footboard support rods 40 are similar in construction to each other and are jointly fastened at the front end with the upright handlebar 22 by a lashing member 41 which is formed of a lashing seat 412, two side plates 413, and a connection rod 414. The lashing seat 412 is fastened with the upright handlebar 22. The two side plates 413 are fastened pivotally at one end with the lashing seat 412 by a pivot 42 such that other ends of the two side plates 413 are fastened with the connection rod 414 by a fastening bolt 43. The other ends of the two side plates 413 are provided with a projection 51 which is provided with a plurality of fastening holes 53. The footboard support rods 40 are formed of an inner tube 44 and an outer tube 45 which is slidably fitted over the rear end of the inner tube 44 in conjunction with a locking ring 49 which is fitted over the outer tube 45 such that the inner threads 48 of the locking ring 49 are engaged with the outer threads 47 of the front end of the outer tube 45. The front end of the outer tube 45 is provided with an elastic slot 46. The front end of the inner-tube 44 is provided with a slot 52 which is provided in two side walls with a plurality of fastening holes 54 corresponding in location to the fastening holes 53 of the projection 51 of the side plate 413, as shown in FIG. 5. The projection 51 and the slot 52 form a fastening portion 50. The side plate 413 is fastened with the inner tube 44 of the footboard support rod 40 by a plurality of fastening bolts 55 which are received in the fastening holes 53 of the projection 51 and the fastening holes 54 of the slot 52 into which the projection 51 is fitted. The outer tube 45 of the two footboard support rods 40 is provided on the rear end with a footboard 60 mounted thereof, and in the underside with a rear wheel frame 62 fastening thereto for mounting a rear wheel 61.

Figure 10:
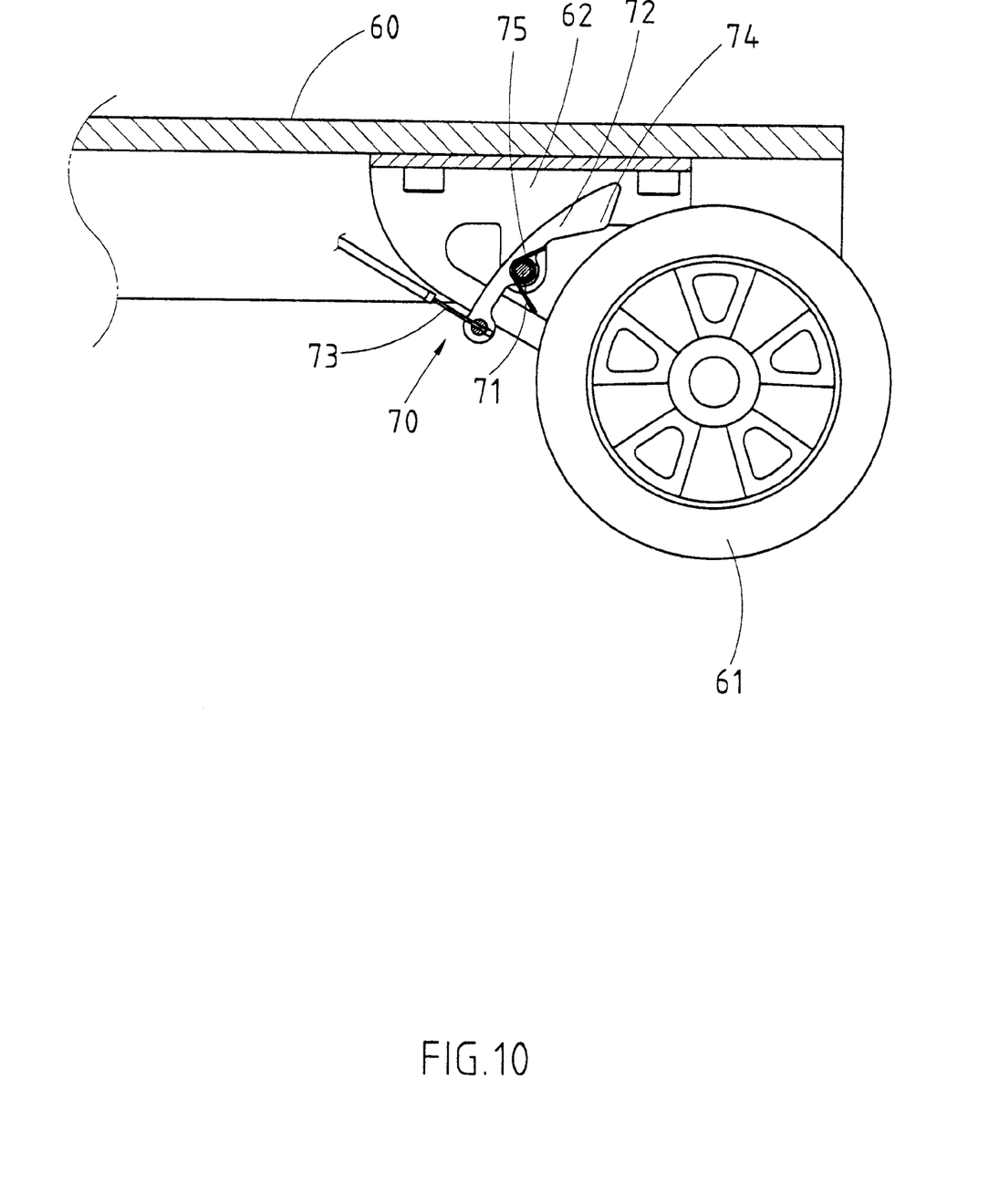
FIG. 10 shows a side schematic view of the braking device of the tricycle of the present invention.
Figure 11:
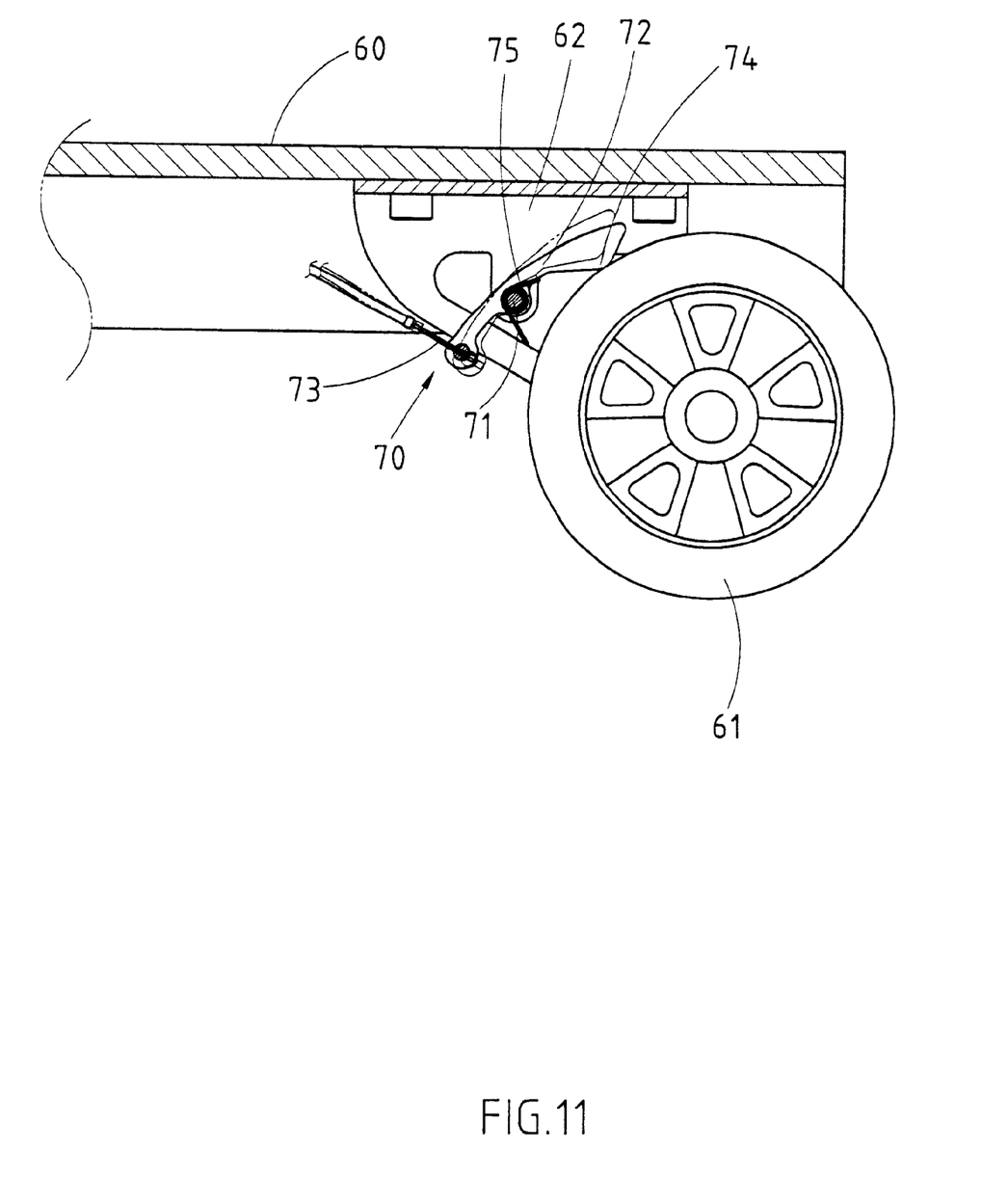
FIG. 11 shows a side schematic view of the braking device of the tricycle of the present invention in action.

The two braking devices 70 are respectively fastened to the rear end of the outer tube 45 and are formed of a rotary support rod 71 and a braking rod 72 pivoted with the rotary support rod 71 such that one end of the braking rod 72 is fastened with a brake cable 73, and that other end of the braking rod 72 is provided with a braking portion 74. When the braking rod 72 is actuated by the brake cable 73 to turn, the braking portion 74 is forced against the rear wheel 61 in motion, so as two slow down or stop the tricycle of the present invention. The braking rod 72 and the rotary support rod 71 are pivoted together in conjunction with a torsion spring 75. The torsion spring 75 serves to provide the braking rod 72 with a recovery force. The braking devices 70 of the tricycle of the present invention prevent the rear wheels 61 from being jammed at the time when the braking devices 70 are activated.

The two footboard support rods 40 of the present invention are fastened with the upright handlebar 22 by the lashing member 41 and the fastening portions 50. As a result, the tricycle frame of the present invention is capable of withstanding a torsional force which is produced by the process of twisting two legs of an operator of the tricycle.

In light of the two footboard support rods 40 being formed of the inner tube 44 and the outer tube 45, the two footboard support rods 40 can be adjusted in length so as to bring about a change in the axial distance between the front wheel 31 and the rear wheels 61.

I claim:

1. A tricycle operated by torsion thereof, said tricycle comprising:

a steering rod formed of a horizontal handlebar and an upright handlebar;

a front wheel frame fastened pivotally with a bottom end of said upright handlebar for mounting a front wheel by an axle, said front wheel frame provided with two elongated holes which are opposite in location to each other and are provided with a plurality of locating portions for locating said axle in said elongated holes;

two footboard support rods, each being formed of an inner tube and an outer tube slidably fitted over said inner tube in conjunction with a locking ring, said inner tube being provided at a front end with a slot which is provided in side walls thereof with a plurality of fastening holes, said outer tube being provided at a rear end with a footboard fastened therewith and a rear wheel frame pivoted thereto for mounting a rear wheel;

a lashing member formed of a lashing seat, two side plates, and a connection rod, said lashing seat being fastened with said upright handlebar, said two side plates being fastened at one end with said lashing seat such that other end of said side plates is fastened with said connection rod, said other end of said side plates being provided with a projection extending therefrom and having a plurality of fastening holes whereby said lashing member is fastened with said two footboard support rods such that said projection of said two side plates of said lashing member is fitted into said slot of said inner tube of said footboard support rods in conjunction with a plurality of fastening bolts which are received in said fastening holes of said projection and said fastening holes of said side walls of said slot; and two braking devices, each being mounted at the rear end of said outer tube and formed of a rotary support rod and a braking rod pivoted with said rotary support rod such that one end of said braking rod is fastened with a brake cable, said braking rod being provided at other end with a braking portion whereby said braking portion of said braking rod is forced against said rear wheel at such time when said braking rod is actuated by said brake cable.

* * * * *